United States Patent [19]

Marimon et al.

[11] 3,744,015

[45] July 3, 1973

[54] AUTOMATIC ELECTRONIC FILTER SYSTEM

[75] Inventors: Robert L. Marimon, Arcadia; Robert L. Matthews, Pasadena, both of Calif.; Michael D. Maughan, deceased, late of Salt Lake City, Utah by Thera Maughan, administratrix

[73] Assignee: The United States of America as represented by the Secretary of the Navy, Washington, D.C.

[22] Filed: Apr. 14, 1972

[21] Appl. No.: 244,184

[52] U.S. Cl. .................. 340/3 D, 325/331, 325/418, 325/474, 325/477

[51] Int. Cl. .............................................. G01s 9/66

[58] Field of Search ..................... 340/3 D; 325/331, 325/332, 418, 474, 477, 489

[56] References Cited

UNITED STATES PATENTS

| | | | |
|---|---|---|---|
| 3,441,905 | 4/1969 | Auer, Jr. et al. | 340/3 D |
| 3,711,822 | 1/1973 | Muller | 340/3 D |
| 3,681,745 | 8/1972 | Perlman et al. | 340/3 D |
| 3,593,256 | 7/1971 | Gannon | 325/474 |
| 3,678,394 | 7/1972 | Ebisch | 325/477 |

*Primary Examiner*—Benjamin A. Borchelt
*Assistant Examiner*—A. M. Psitos
*Attorney*—Richard S. Sciascia, Ervin F. Johnston et al.

[57] ABSTRACT

A combination bandpass and rejection filter system having a null point at a center frequency, comprising:

a local oscillator for generating any of a range of basic frequencies, a specific one comprising a center frequency $f_{LO}$;

a direct channel filter circuit connected to the output of the local oscillator and adaptable for connection to an input signal $f_{in}$, generally containing low and high frequency components;

a quadrature channel filter circuit connected to the output of the local oscillator and adaptable for connection to the same input signal, $f_{in}$, the signal propagating through this filter circuit containing low and high frequency components having a phase angle with respect to corresponding low and high frequency components in the direct channel input filter; and a summing amplifier connected to the direct and quadrature channel filter circuits, which vectorially sums the low and high frequency components from each filter circuit in a manner so that wanted components are enhanced and unwanted components are diminished, with a null point at the center frequency $f_{LO}$.

6 Claims, 2 Drawing Figures

AUTOMATIC ELECTRONIC FILTER SYSTEM AND DOPPLER THRESHOLD

PATENTED JUL 3 1973
3,744,015
SHEET 1 OF 2
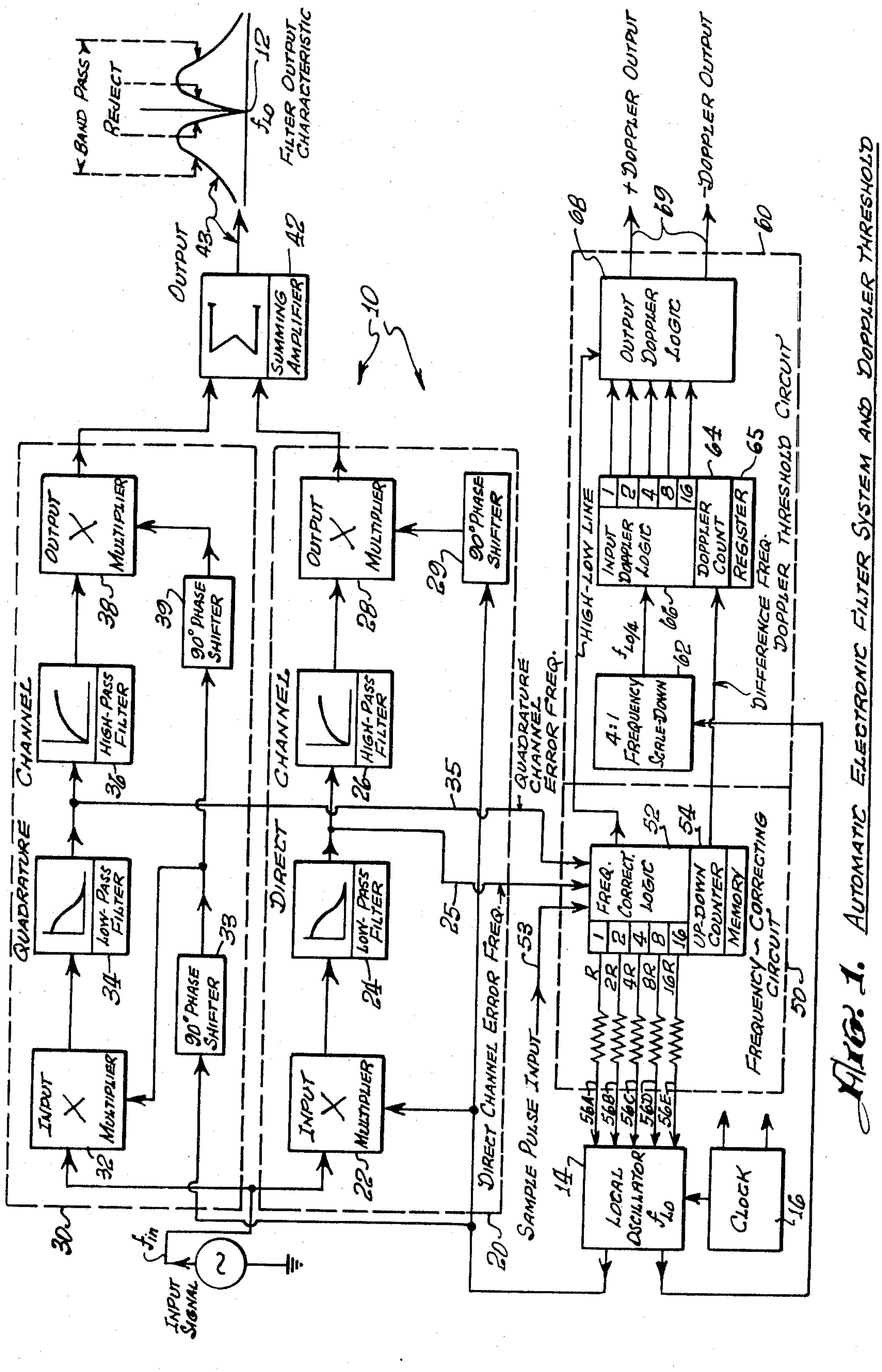
FIG. 1. AUTOMATIC ELECTRONIC FILTER SYSTEM AND DOPPLER THRESHOLD PATENTED JUL 3 1973 3,744,015
SHEET 2 OF 2
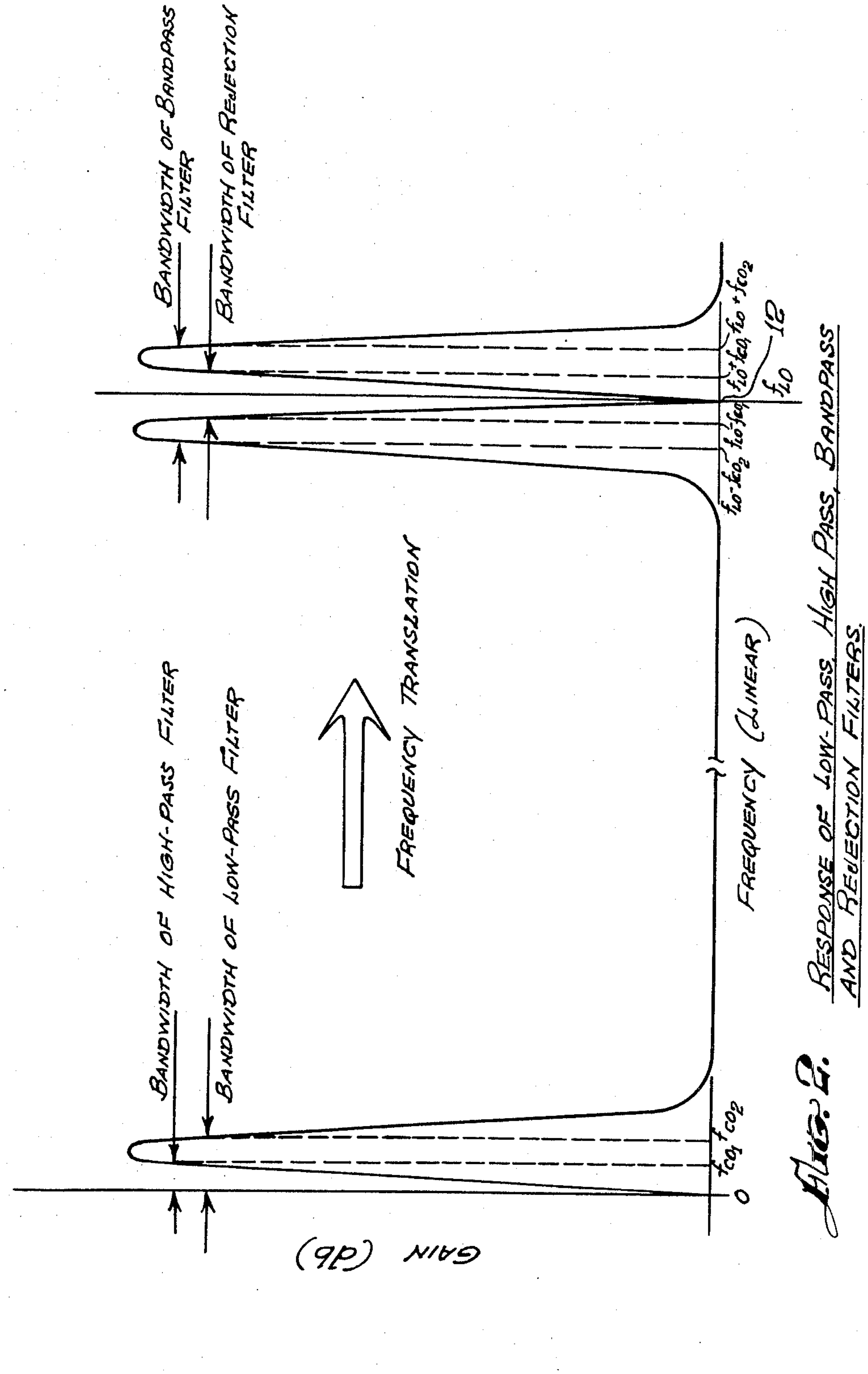
FIG. 2 RESPONSE OF LOW-PASS, HIGH PASS, BANDPASS AND REJECTION FILTERS.

AUTOMATIC ELECTRONIC FILTER SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a bandpass and rejection filter system to be used in a sonar receiver. It has the following characteristics:

1. It has a filter system with a programmable center frequency and provisions to measure the error between the center frequency and the input frequency; 2. it comprises a filter configuration that is adaptable to integrated circuit design; 3. it is stable with temperature and aging, and 4 it has a capability for high Q responses.

The *n*-path filter approach used in the present invention has been used in the prior art, but little previous work has been done to develop a rejection filter characteristic.

In the prior art, bandpass and rejection filter combinations have been built in a variety of ways. One of the most commonly used is a filter composed of strictly passive components. The inductors used in this approach create two inherent disadvantages; the electrical characteristics tend to drift with temperature and age, and the physical size required to obtain the necessary inductance and Q is not compatible with integrated circuit design. Passive filters make automatic center frequency adjustments rather impractical to implement, and subsequent signal processing must still be done at the carrier frequency. Another disadvantage comes from the inability to externally control the system center frequency. The passive elements can be tuned, as desired, but any errors or drift in these elements cause the center frequency to shift.

Another prior art approach using active components to simulate the characteristics of an inductor solves some of the difficulties associated with passive filters. Without inductors, the size of the filter and inductor draft are no longer problems. However, control of the center frequency is still held by the resistors, capacitors, and active components, and as they shift, so does the filter. There is still difficulty in automatically correcting the center frequency accurately.

SUMMARY OF THE INVENTION

The automatic electronic filter system of this invention comprises: a two-path bandpass and rejection filter with one path, or channel, driven 90° out of phase from the other at the local oscillator frequency, $f_{LO}$; a digital frequency-correcting circuit which, on command, shifts the frequency $f_{LO}$, to track the input frequency, $f_{in}$; a clock to generate the frequency $f_{LO}$; a digital frequency detector or doppler threshold, which can measure $f_{in}-f_{LO}$. Each of the two channels of the filter contain an input analog multiplier, an integrated circuit, followed first by a low-pass and then a high-pass filter. A second, output, analog multiplier, also an integrated circuit, is driven by the high-pass filter, and serves as the chennel output element. The signals in the two channels are summed together in a summing circuit, yielding the desired filter response.

OBJECTS OF THE INVENTION

It is an object of the invention to provide a filter system using low-pass, high-pass, filter combinations having an overall bandpass response within which is centered a rejection characteristic.

Another object of the invention is to provide a filter system having as a feature automatic frequency correction using a closed loop process.

Still another object of the invention is to provide a filter system which can measure the amplitude and polarity of a doppler signal without using a separate frequency discriminator.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a block diagram of the automatic electronic filter system.

FIG. 2 is a graph showing the response of the low-pass, high-pass, bandpass and rejection filters.

Referring now to the figures, FIG. 1 shows, in its broadest form, a combination bandpass and rejection filter system 10, having a null point at a center frequency 12, comprising a local oscillator 14 controlled by a clock 16, for generating any of a range of basic square wave frequencies, and a specific sinusoidal frequency, $f_{LO}$, for the multipliers. A direct channel filter circuit 20 is connected to the output of the local oscillator 14 and is adaptable for connection to an input signal, $f_{in}$, generally containing low and high frequency components. A quadrature channel filter circuit 30 is connected to the output of the local oscillator 14, and is adaptable for connection to the same input signal, $f_{in}$, the signal propagating through this filter circuit containing low and high frequency components having a phase angle with respect to corresponding low and high frequency components in the direct channel input filter 20. A summing amplifier 42 which is connected to, and has inputs from, the direct and quadrature channel filter circuits, 20 and 30 respectively, vectorially sums the low and high frequency components from each filter circuit in a manner so that wanted components are enhanced and unwanted components are diminished, with a null point at the center frequency $f_{LO}$, shown by reference numeral 12 at the upper right side of FIG. 1.

The combination filter system 10 further comprises frequency-correcting circuitry 50 connected to, and having inputs from, the direct and quadrature channel filter circuits, 20 and 30, and connected to the local oscillator 14, which samples the low-frequency components from the two filter circuits, 20 and 30, and generates an error voltage which is fed to the local oscillator, thereby changing its frequency $f_{LO}$ in a direction to maintain the center frequency constant even with variation of the frequency of the input signal $f_{in}$.

Each channel filter circuit, 20 and 30, comprises (1) an input multiplier, 22 or 32, connectable to the input signal $f_{in}$, which down-translates the input signal; (2) a low-pass filter, 24 or 34, whose input is connected to the output of the input multiplier; (3) a high-pass filter, 26 or 36, whose input is connected to the output of the low-pass filter, and (4) an output multiplier, 28 or 38, whose input is connected to the output of the high-pass filter.

In addition, the quadrature filter 30 further comprises a first 90° phase shifter 33, whose input is connected to the output of the local oscillator 14 and whose output feeds into the quadrature channel input multiplier 32, for shifting the phase of the input signal $f_{in}$ substantially 90°.

The combination filter 10 further comprises a second 90° phase shifter 39, whose input is the output of the first 90° phase shifter 33, and whose output feeds into the quadrature channel output multiplier 38, for shifting the phase of the quadrature channel signal substantially an additional 90°; and a third 90° phase shifter 29, whose input is connected to the output of the local oscillator 14 and whose output is connected to the direct channel output multiplier, for shifting the phase of the direct channel signal substantially 90°.

The circuit 10 thus far described has some of the features of Barber's method, which is described in the May 1947 issue of the "Wireless Engineer," in an article entitled "Narrow Bandpass Filter Using Modulation," by N. F. Barber.

Most systems in the prior art depend on exact quadrature between two signals. However, Barber's method only requires that they be in approximate quadrature. This method densensitizes the sensitivity of the phase shift, in that there may be some variation of phase angle from the desired 90°, which results in some reduction of amplitude, but also in an absence of spurious frequencies.

The operation of the filter 10 may be described by reference to frequency translation processes. The input multipliers 22 and 32 down-translate $f_{in}$ to a lower frequency, where the combination of the low-pass and high-pass filter responses mold the amplitude at the lower frequency. The output multipliers 28 and 38 up-translate the resultant signal, giving the combined bandpass rejection filter response, centered around $f_{LO}$ as shown in FIG. 1, at the upper right. Only the local oscillator frequency, $f_{LO}$, determines the center frequency 12 of the filter 10. The bandwidths of the low-pass and high-pass filters, 24, 34 and 28, 38, determine the bandpass and rejection filter bandwiths, also shown at the upper right. These bandwidths are independently adjustable.

The unwanted frequencies generated by the input multipliers, 22 and 32, are attenuated by the low-pass filters, 24 and 34. The summing process at the output 43 cancels the unwanted signals generated by the output multipliers, 28 and 38, during the up frequency translation. For this reason, two identical paths, one in channel 20 and the other in channel 30, driven 90° out of phase must be used. However, in practice, because of gain and phase differences between the two paths, the spurious signals are not completely cancelled. Barber's Method was used to reduce this problem. Instead of driving both multipliers in one channel with the same signal, Barber's Method uses a 90° phase shift between input and output multipliers as well as a 90° phase shift between channels, in the order shown in FIG. 1. This phasing method makes it unnecessary for the $f_{LO}$ signals in the two channels 20 and 30 to have an exact quadrature relationship, and spurious signals are not developed at the output with small phase errors. This is a particularly desirable feature when $f_{LO}$ is to be a variable frequency, and a simple phase shift network is used, because an exact 90° phase shift only occurs at one frequency.

Discussing now the frequency-correcting circuit 50 in more detail, it comprises logic circuitry 52, having as inputs, and connected to, the outputs of the direct and quadrature channel low-pass filters, 20 and 30, which can determine whether (1) $f_{in} < f_{LO}$ and the signal in the direct channel 20 leads the signal in the quadrature channel 30 by 90°, or (2) $f_{in} > f_{LO}$ and the signal in the direct channel lags the signal in the quadrature channel, the logic circuitry connectable to a source of input sampling pulses 53, during the period of one of which the determination is made.

The sample pulse which appears at the sample pulse input 53 is a single pulse which occurs once during every listening period of the sonar system.

The difference frequency is sampled periodically for a predetermined length of time. The specific time period during which the sampling is done must be chosen with care. For example, it cannot be done during the time when doppler information, discussed hereinbelow, must be examined.

The sampling is done periodically and the rest of the system is scaled during the rest of the time, that is, during the non-sampling time. In one embodiment, the sampling was done every 100 msec.

A binary up-down counter 54 receives a signal from the logic circuitry 52 commanding it to count up or down, depending upon whether $f_{in} > f_{LO}$ or $f_{LO} > f_{in}$, the counter including a circuit which records the number of positive axis crossings of $f_{in} - f_{LO}$ during the sampling period, thereby registering the magnitude of the $f_{in} - f_{LO}$ error.

A resistive network of parallel resistors, 56A through 56E, scaled according to the binary numbers, is connected to and between the local oscillator 14 and the up-down counter 54, the total current flowing across the resistors — any combination of resistors — being proportional to the magnitude of the $f_{in} - f_{LO}$ error, to thereby bring the frequency $f_{LO}$ closer to $f_{in}$.

A memory 58, or storage register, associated with the up-down counter 54, maintains a constant total current across the resistive network, 56A through 56E, until the next sampling pulse from line 53.

Discussing the mode of operation of the frequency-correcting circuit 50 in more detail, the low-frequency signals from the outputs of the low-pass filters 24 and 34 to provide inputs to the automatic frequency correction circuits 50. These low frequency difference signals, $f_{in} - f_{LO}$, provide the necessary information on frequency error to form a closed loop correction system that will, on command, adjust $f_{LO}$ to match the input frequency $f_{in}$. The automatic correction circuitry 50 operates as follows:

1. The phase sequence of the two channels 20 and 30 determines the direction of error; when $f_{in} > f_{LO}$, channel A leads channel B by 90°, and when $f_{in} < f_{LO}$, channel A lags channel B by 90°. This information is used to command the binary counter 54 to count up or down.

2. The binary counter 54 records all the positive axis crossings of $f_{in} - f_{LO}$ during a prescribed sample time, so that it registers the magnitude of the $f_{in} - f_{LO}$ error.

3. The digital output of the counter 54 is scaled and applied to the variable frequency oscillator 14 generating frequency $f_{LO}$, which is adjusted either up or down in frequency, as required, to reduce the $f_{in} - f_{LO}$ error.

4. The $f_{LO}$ signal is then returned to the multipliers to close the loop.

5. At the end of the prescribed sample period, the binary counter acts as a storage register, holding the local oscillator frequency constant until the next sample period. The magnitude of the error, after the sample period, is a function of the sample time and the scaling intervals between the counter and the variable frequency oscillator.

The combination filter 10 further comprises a doppler threshold circuit 60 which includes a frequency scale-down divider circuit 62, whose input is connected to the output of the local oscillator 14, for dividing the input frequency $f_{LO}$ by a small integral value, for example, by 4. A doppler count circuit 64 whose input is the difference frequency, $f_{in} - f_{LO}$, from the binary up-down counter 54, counts the number of $f_{LO}$ axis crossings that occur during a period of the difference frequency $f_{LO} - f_{in}$.

Input doppler logic circuitry 66, one of whose inputs is the output of the divider circuit 62, is connected to the doppler count circuit 64, its function being to determine whether the doppler is positive or negative. Output doppler logic circuitry 68, connected to the input doppler logic circuitry 66 and to the frequency-correcting logic 52, determines when the doppler from a target exceeds a predetermined amount, and makes the information available at its output.

The doppler threshold is another important feature of this invention. The frequency difference, $f_{in} - f_{LO}$, is a direct measure of the amount of doppler when it is measured outside of the sample period. The frequency $f_{LO}$ is not permitted to change outside of the sample period, so, if the time for one cycle of the difference frequency is measured, a logic display can represent the doppler shift. The doppler threshold 60 uses a shift register 65 to count the number of $f_{LO}$ axis crossings that occur during a period of the difference frequency $f_{LO} - f_{in}$. The more pulses the register counts, the smaller the frequency difference or doppler. To determine whether the doppler is positive or negative, the same phase sequence circuitry used in the automatic correction circuit 50 is used. The magnitude and size of the doppler is combined to form the doppler threshold. When a target exceeds a predetermined amount of doppler, the information is taken from the register to operate a doppler threshold. This principle can be expanded to include several threshold levels or a continuous readout of the doppler.

FIG. 2 shows the response of the combination filter 10, showing its low-pass, high-pass, band-pass, and rejection characteristics.

A band-pass and rejection filter system is particularly useful in sonar, but would also be useful in radar.

The rejection feature of the filter output characteristic is particularly useful because of the nature of the received sonar signal. In sonar it is desirable to reject the reverbations which return usually in a particular range of frequencies. The rejection range, that is, the notch 12, of the filter is designed for the same range of reverberation frequencies.

The automatic electronic filter system 10 of this invention has many advantages over previously used methods. Because of the $n$-path filter approach that is used, it is possible to implement a practical closed loop system. The filter 10 itself has some distinct advantages over previously used filters. The stability of the filter is excellent because only resistors and capacitors determine the filter bandwidths, and the local oscillator 14 determines the center frequency $f_{LO}$. No inductors are present to create size limitations or temperature and age drifts. With the current trend toward integrated circuit design, this system qualifies very well. The analog multipliers, 22, 32 and 28, 38, which in the past have been a limitation for $n$-path filters, are now inexpensive in integrated form. The resistors and capacitors are all small enough to be adaptable to hybrid microcircuit design.

With the filter system 10 as the key, a whole sonar receiver could be controlled and synchronized by this one local oscillator 14. Any changes in the oscillator 14 would change the whole receiver and not effect the synchronization.

All the signal processing is done at low frequencies where stray inductance and capacitance will not effect the filter performance, and where performance of microcircuits such as operational amplifiers is very good. The frequency response of the filter may be changed simply by replacing the low-pass and high-pass filter elements, 24, 34 and 26, 36. The electronic filter characteristics such as bandwidth and roll-off per octave can be adjusted by changing the bandwidth and roll-off characteristics of the low-pass and high-pass filters, 24, 34 and 26, 36. If it is required, active low-pass and high-pass filters may be used in place of the passive elements. Again, since the signal processing is done at very low frequencies, active filters having very high performance are available. However, the $n$-path filter can make a simple low Q filter, centered at a direct-current value, into a high Q filter centered at the carrier frequency. For this reason, the basic filters do not need to be complex for most applications.

This invention comprises the first $n$-path filter design to use low-pass high-pass filter combinations to create an overall band-pass response within which is centered a rejection characteristic. The quadrature band-pass filter does appear in the prior art, but the combination of a low-pass and a high-pass filter to generate the band-pass-rejection characteristic is novel with this design.

The feature of an automatic frequency correction using a closed loop process is also novel. Using the low frequency difference signal to control the local oscillator 14 is the heart of the process.

The method of using the $f_{in} - f_{LO}$ difference frequency, and the phase sequence of the channels to measure the amplitude and polarity of the input doppler is also a novel concept with this design. In the prior art, an independent frequency discriminator was used for this measurement.

One alternative could be used in the input stage of the filter. Instead of multipliers at the input, almost any frequency translation device can be used. In fact, by using modulators, field-effect-transistor (FET) switches, mixers, etc., it may be possible to develop a lower noise system.

What is claimed is:

1. A combination bandpass and rejection filter system having a null point at a center frequency, comprising:

a local oscillator for generating any of a range of basic frequencies, a specific one comprising a center frequency $f_{LO}$:

a direct channel filter circuit connected to the output of the local oscillator and adaptable for connection to an input signal, $f_{in}$, generally containing low and high frequency components;

a quadrature channel filter circuit connected to the output of the local oscillator and adaptable for connection to the same input signal, $f_{in}$, the signal propagating through this filter circuit containing low and high frequency components having a phase angle with respect to corresponding low and high frequency components in the direct channel input filter; and a summing amplifier connected to the direct and quadrature channel filter circuits, which vectorially sums the low and high frequency components from each filter circuit in a manner so that wanted components are enhanced and unwanted components are diminished, with a null point at the center frequency $f_{LO}$.

2. The combination filter system according to claim 1, further comprising:

frequency-correcting circuitry connected to the direct and quadrature channel filter circuits and to the local oscillator, which samples the low-frequency components from the two filter circuits and generates an error voltage which is fed to the local oscillator, thereby changing its frequency $f_{LO}$ in a direction to maintain the center frequency constant even with variation of the frequency of the input signal $f_{in}$.

3. The combination filter according to claim 2, wherein each channel filter circuit comprises:

an input multiplier, connectable to the input signal $f_{in}$, which down translates the input signal;

a low-pass filter, whose input is connected to the output of the input multiplier;

a high-pass filter, whose input is connected to the output of the low-pass filter;

an output multiplier, whose input is connected to the output of the high-pass filter; and further comprising:

a first 90° phase shifter, whose output is connected to the output of the local oscillator and whose input feeds into the quadrature channel input multiplier, for shifting the phase of the input signal $f_{in}$ substantially 90°.

4. The combination filter according to claim 3, further comprising:

a second 90° phase shifter, whose input is the output of the first 90° phase shifter and whose output feeds into the quadrature channel output multiplier, for shifting the phase of the quadrature channel signal substantially an additional 90°; and a third 90° phase shifter, whose input is connected to the output of the local oscillator and whose output is connected to the direct channel output multiplier, for shifting the phase of the direct channel signal substantially 90°.

5. The combination filter according to claim 4, wherein the frequency-correcting circuit comprises:

logic circuitry, having as inputs, and connected to, the outputs of the direct and quadrature channel low-pass filters, which can determine whether (1) $f_{in} > f_{LO}$ and the signal in the direct channel leads the signal in the quadrature channel by 90°, or (2) $f_{in} < f_{LO}$ and the signal in the direct channel lags the signal in the quadrature channel, the logic circuitry connectable to a source of input sampling pulses, during the period of one of which the determination is made;

a binary up-down counter, which receives a signal from the logic circuitry commanding it to count up or down, depending upon whether $f_{in} > f_{LO}$ or $f_{LO} < f_{in}$, the counter including a circuit which records the number of positive axis crossings of $f_{in} - f_{LO}$ during the sampling period, thereby registering the magnitude of the $f_{in} - f_{LO}$ error;

a resistive network of parallel resistors scaled according to the binary numbers, connected to and between the local oscillator and the up-down counter, the total current flowing across the resistors being proportional to the magnitude of the $f_{in} - f_{LO}$ error, to thereby bring the frequency $f_{LO}$ closer to $f_{in}$; and a memory, or storage register, associated with the up-down counter, which maintains a constant total current across the resistive network until the next sampling pulse.

6. The combination filter according to claim 5, further comprising: a doppler threshold circuit which comprises:

a frequency scale-down divider circuit, whose input is connected to the output of the local oscillator, for dividing the input frequency $f_{LO}$ by a small integral value;

a doppler count circuit whose input is the difference frequency, $f_{in} - f_{LO}$, from the binary up-down counter, which counts the number of $f_{LO}$ axis crossings that occur during a period of the difference frequency $f_{LO} - f_{in}$;

input doppler logic circuitry, one of whose inputs is the output of the divider circuit, the doppler logic circuitry being connected to the doppler count circuit, its function being to determine whether the doppler is positive or negative;

output doppler logic circuitry, connected to the input doppler logic circuitry and to the frequency-correcting logic, which determines when the doppler from a target exceeds a predetermined amount, and makes the information available at its output.

* * * * *